(12) United States Patent
Poli (10) Patent No.: US 10,419,442 B2
(45) Date of Patent: Sep. 17, 2019

(54) DETECTING DEVICE MOVEMENT THROUGH ANALYSIS OF DEVICE ENVIRONMENT

(71) Applicant: ARRIS Enterprises LLC, Suwanee, GA (US)

(72) Inventor: Christopher Poli, Doylestown, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 86 days.

(21) Appl. No.: 15/131,693

(22) Filed: Apr. 18, 2016

(65) Prior Publication Data

US 2016/0308865 A1    Oct. 20, 2016

Related U.S. Application Data

(60) Provisional application No. 62/149,961, filed on Apr. 20, 2015.

(51) Int. Cl.
*H04W 4/02* (2018.01)
*H04L 29/06* (2006.01)
(Continued)

(52) U.S. Cl.
CPC .......... *H04L 63/107* (2013.01); *G01S 5/0252* (2013.01); *G01S 5/14* (2013.01);
(Continued)

(58) Field of Classification Search
CPC .. G01S 5/0252; G01S 5/14; G06F 2221/2111; H04L 43/16; H04L 63/0876;
(Continued)

(56) References Cited

U.S. PATENT DOCUMENTS

2013/0225204 A1\* 8/2013 Mathews ........... H04N 21/4126
455/456.3
2014/0307715 A1\* 10/2014 Nanda ................... H04W 48/16
370/332
(Continued)

FOREIGN PATENT DOCUMENTS

WO    2006/022927 A2    3/2006
WO    2015/042017 A1    3/2015

OTHER PUBLICATIONS

PCT Search Report & Written Opinion, Re: Application No. PCT/US2016/028120, dated Jun. 28, 2016.

*Primary Examiner* — Theodore C Parsons
(74) *Attorney, Agent, or Firm* — Bart A. Perkins (57) ABSTRACT

Methods, systems, and computer readable media can be operable to facilitate the monitoring and detection of a device relocation. A location fingerprint may be generated for a device, wherein the location fingerprint includes information associated with proximal devices. Proximal devices may be identified based on communications received by the device from the proximal devices, and may include devices that are determined to be near in proximity to the device. A baseline location fingerprint may be generated at an instance when the device is expected to be within a designated premise. Subsequent captures of a location fingerprint of the device may be periodically or conditionally taken, and the subsequent location fingerprints may be compared to the baseline location fingerprint. If a significant difference exists between a subsequent location fingerprint and the baseline location fingerprint, a determination may be made that the device has potentially been relocated away from a designated premise.

16 Claims, 5 Drawing Sheets

(51) Int. Cl.
*H04W 64/00* (2009.01)
*H04L 12/26* (2006.01)
*H04W 4/021* (2018.01)
*G01S 5/02* (2010.01)
*H04W 4/04* (2009.01)
*G01S 5/14* (2006.01)
*H04W 4/029* (2018.01)

(52) U.S. Cl.
CPC .......... *H04L 43/16* (2013.01); *H04L 63/0876* (2013.01); *H04W 4/021* (2013.01); *H04W 4/023* (2013.01); *H04W 4/04* (2013.01); *H04W 64/00* (2013.01); *G06F 2221/2111* (2013.01); *H04W 4/029* (2018.02); *H04W 64/006* (2013.01)

(58) Field of Classification Search
CPC .... H04L 63/107; H04W 4/021; H04W 4/023; H04W 4/028; H04W 4/04; H04W 64/00; H04W 64/006
See application file for complete search history.

(56) References Cited

U.S. PATENT DOCUMENTS

2015/0208226 A1* 7/2015 Kuusilinna ........... H04W 8/005
455/414.3
2016/0241708 A1* 8/2016 Abraham ................ H04W 4/02
2016/0330197 A1* 11/2016 Barillaud ........... H04L 63/0861

* cited by examiner

DETECTING DEVICE MOVEMENT THROUGH ANALYSIS OF DEVICE ENVIRONMENT

CROSS REFERENCE TO RELATED APPLICATION

This application is a non-provisional application claiming the benefit of U.S. Provisional Application Ser. No. 62/149,961, entitled "Identifying Customer Premise Equipment Device Movement through Electronic Fingerprint Characterization Analytics," which was filed on Apr. 20, 2015, and is incorporated herein by reference in its entirety.

TECHNICAL FIELD

This disclosure relates to the detection of potential misuse of a customer premise equipment device.

BACKGROUND

Typically, a multiple system operator (MSO) will lease a customer premise equipment (CPE) device to a subscriber so that the subscriber may receive and interact with multiple services offered by the MSO. Subscription terms typically limit the use of the leased CPE device to use within a certain premise or by a certain subscriber. However, it is not uncommon for the CPE device to be sold by a subscriber to a third party, or for the CPE device to be improperly relocated to another premise.

Prior solutions typically involve only a comparison between direct network information being reported or a single wireless network association and a known piece of subscriber network information. However, this information is subject to change or to replicate by moving an associated access device or by accessing a common network. Therefore, it is desirable to improve upon methods and systems for detecting and alerting a relocation of a device away from a designated premise.

BRIEF DESCRIPTION OF THE DRAWINGS

Like reference numbers and designations in the various drawings indicate like elements.

DETAILED DESCRIPTION

It is desirable to improve upon methods and systems for detecting and alerting a relocation of a device away from a designated premise. Methods, systems, and computer readable media can be operable to facilitate the monitoring and detection of a device relocation. A location fingerprint may be generated for a device, wherein the location fingerprint includes information associated with proximal devices. Proximal devices may be identified based on communications received by the device from the proximal devices, and may include devices that are determined to be near in proximity to the device. A baseline location fingerprint may be generated at an instance when the device is expected to be within a designated premise. Subsequent captures of a location fingerprint of the device may be periodically or conditionally taken, and the subsequent location fingerprints may be compared to the baseline location fingerprint. If a significant difference exists between a subsequent location fingerprint and the baseline location fingerprint, a determination may be made that the device has potentially been relocated away from a designated premise.

Methods, systems and computer readable media described herein can be operable to facilitate the creation of a fingerprint from both direct and indirect sources and may use analytics that can be examined over time to identify significant transient and non-transient changes in the fingerprint information that can then be acted upon. In embodiments, all available data from both the network(s) and device(s) surrounding a device, as well as the over the air networks, may be used to create an effective fingerprint of the electronic or network environment into which the device is deployed. The effective fingerprint may be used to define a subscriber's home environment(s) and compare, on an on-going basis, the fingerprint returned by the device, companion device or other network associated devices to identify device movement outside a subscriber premise.

An embodiment of the invention described herein may include a method comprising: (a) detecting a trigger for capturing a current location fingerprint associated with a first device; (b) identifying one or more proximal devices associated with the first device, wherein the one or more proximal devices comprise one or more devices that are determined to be within a predetermined proximity to the first device or one or more networks having a range within which the first device is located; (c) retrieving information associated with the one or more proximal devices; (d) logging the retrieved information associated with the one or more proximal devices as the current location fingerprint; (e) comparing the current location fingerprint to a baseline location fingerprint, wherein the baseline location fingerprint comprises information associated with one or more proximal devices previously identified as being associated with the first device; and (f) when a difference exists between the current location fingerprint and the baseline location fingerprint, outputting an alert indicating a potential relocation of the first device.

According to an embodiment of the invention, the difference between the current location fingerprint and the baseline location fingerprint comprises a significant difference, the significant difference comprising a difference that is greater than a predetermined difference threshold that is based on one or more network environment factors associated with the first device.

According to an embodiment of the invention, the difference between the current location fingerprint and the baseline location fingerprint comprises a significant difference, the significant difference comprising the absence of one or more predetermined proximal devices from the current location fingerprint, and the one or more predetermined proximal devices are identified by the baseline location fingerprint.

According to an embodiment of the invention, the retrieved information associated with each respective one proximal device of the one or more proximal devices comprises a unique identifier associated with the respective one proximal device.

According to an embodiment of the invention, the retrieved information associated with each respective one proximal device of the one or more proximal devices comprises an identification of the proximity of the proximal device to the first device.

According to an embodiment of the invention, the identification of the proximity of the proximal device to the first device comprises an indication of the signal strength between the proximal device and the first device.

According to an embodiment of the invention, one or more of the proximal devices are identified based upon one or more wireless communications received at the first device from the one or more proximal devices.

According to an embodiment of the invention, the method described herein further comprises updating the baseline location fingerprint with the current location fingerprint when a significant difference does not exist between the current location fingerprint and the baseline location fingerprint.

An embodiment of the invention described herein may include an apparatus comprising: (a) one or more modules configured to: (i) detect a trigger for capturing a current location fingerprint associated with a first device; (ii) identify one or more proximal devices associated with the first device, wherein the one or more proximal devices comprise one or more devices that are determined to be within a predetermined proximity to the first device or one or more networks having a range within which the first device is located; and (b) one or more interfaces configured to be used to retrieve information associated with the one or more proximal devices; (c) wherein the one or more modules are further configured to: (i) log the retrieved information associated with the one or more proximal devices as the current location fingerprint; and (ii) compare the current location fingerprint to a baseline location fingerprint, wherein the baseline location fingerprint comprises information associated with one or more proximal devices previously identified as being associated with the first device; and (d) wherein the one or more interfaces are further configured to be used to output an alert indicating a potential relocation of the first device when a difference exists between the current location fingerprint and the baseline location fingerprint.

An embodiment of the invention described herein may include one or more non-transitory computer readable media having instructions operable to cause one or more processors to perform the operations comprising: (a) detecting a trigger for capturing a current location fingerprint associated with a first device; (b) identifying one or more proximal devices associated with the first device, wherein the one or more proximal devices comprise one or more devices that are determined to be within a predetermined proximity to the first device or one or more networks having a range within which the first device is located; (c) retrieving information associated with the one or more proximal devices; (d) logging the retrieved information associated with the one or more proximal devices as the current location fingerprint; (e) comparing the current location fingerprint to a baseline location fingerprint, wherein the baseline location fingerprint comprises information associated with one or more proximal devices previously identified as being associated with the first device; and (f) when a difference exists between the current location fingerprint and the baseline location fingerprint, outputting an alert indicating a potential relocation of the first device.

Figure 1:
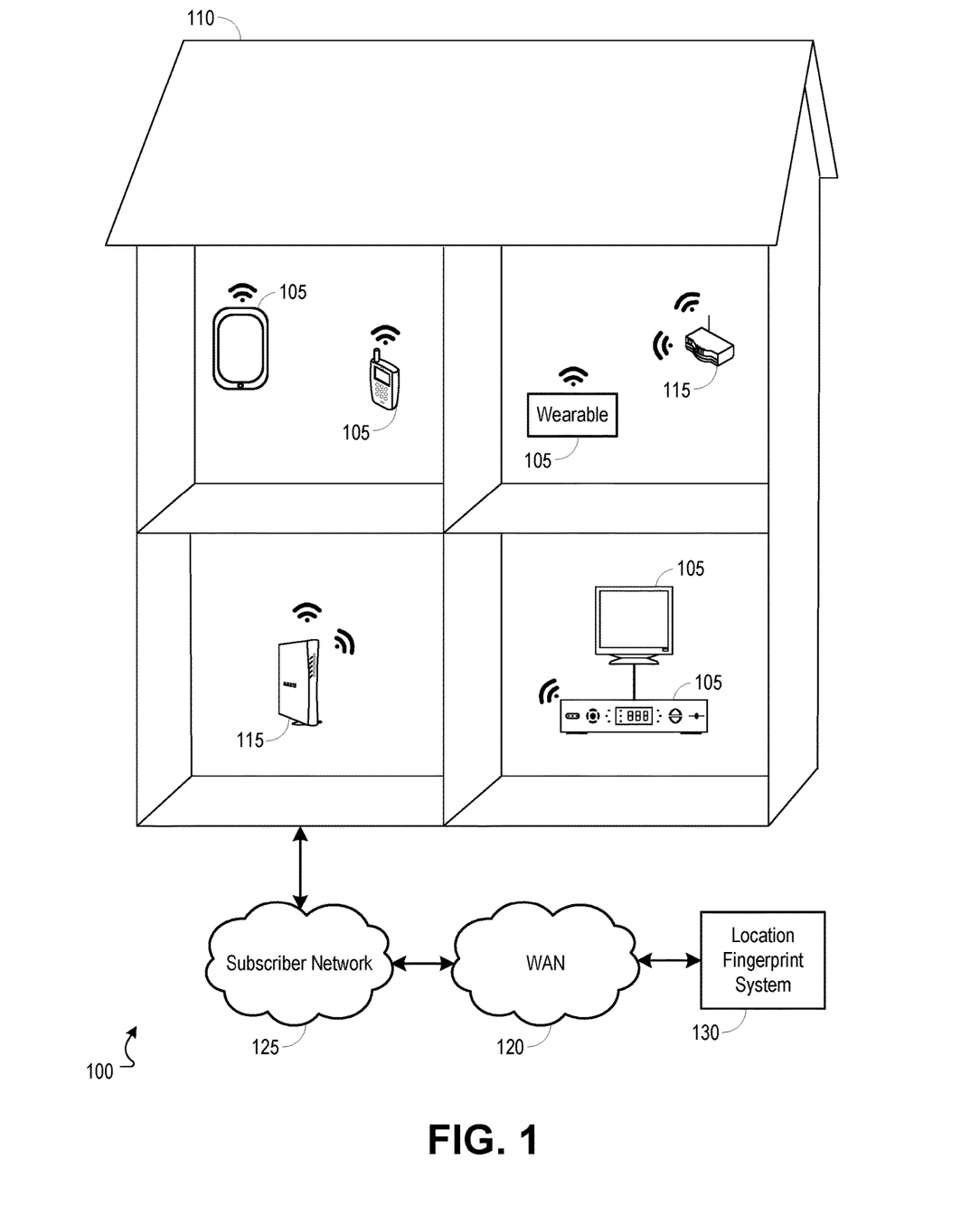
FIG. 1 is a block diagram illustrating an example network environment operable to facilitate the monitoring and detection of a device relocation.

FIG. 1 is a block diagram illustrating an example network environment 100 operable to facilitate the monitoring and detection of a device relocation. In embodiments, video, voice, and/or data services may be delivered to one or more client devices 105. Client devices 105 may include a set-top box (STB), television, mobile device, tablet, computer, gaming console, wearable device (e.g., smart watch, glasses, etc.) and any other device operable to receive video, voice, and/or data services.

Multiple services may be delivered to client devices 105 within a subscriber premise 110 over one or more local networks (e.g., coaxial network, a local area network (LAN), wireless local area network (WLAN), personal area network (PAN), Multimedia over Coax Alliance (MoCA) network, mobile hotspot network, and any other interconnectivity operable to route communications to and from client devices 105), and delivery of the multiple services may be facilitated by one or more access devices 115. Access devices 115 may include any device configured to receive and/or deliver communications or services to one or more client devices 105. For example, access devices 115 may include a gateway device, a wireless router, a network extender, or any other access point. It should be understood that one or more access devices 115 may be integrated with each other or with other devices. For example, a client device 105 may operate as a station or an access point.

It should be understood that delivery of the multiple services over the local network(s) may be accomplished using a variety of standards and formats. It will be appreciated by those skilled in the relevant art that client devices 105 may be capable of interacting and communicating with each other and/or with an access device 115 over various wired and wireless communication standards (e.g., Wi-Fi, Bluetooth, etc.).

Multiple services may be provided to a subscriber premise 110 from a WAN 120 through a subscriber network 125. The subscriber network 125 may include, for example, a hybrid fiber-coaxial (HFC) network, fiber network, mobile network, and any other network operable to deliver services to a subscriber premise 110.

In embodiments, a client device 105 or access device 115 may be deployed in a subscriber premise 110 as a customer premise equipment (CPE) device. For example, a CPE device may include a STB, gateway device, cable modem, wireless router, network extender, and any other device that may be leased by a subscriber or used by a subscriber to receive services provided by a multiple systems operator (MSO).

When a device (e.g., client device 105 or access device 115) is deployed in a subscriber premise, the device may be in proximity to one or more other devices and/or networks, and the device may be able to communicate with or through the other devices and/or networks. It will be appreciated by those skilled in the relevant art that the device may be configured to communicate with other devices and/or networks using various interfaces, standards and protocols, and that communications may be carried over a wired or wireless connection.

In embodiments, an effective fingerprint may be created for a deployed device. The effective fingerprint may include an identification of one or more devices or specific companion application instances that are associated with the deployed device and various characteristics of the association between the device(s) and the deployed device. The devices associated with the deployed device may be devices associated with the same subscriber or subscriber premise 110 as the deployed device, devices that are identified as being in proximity of the deployed device, devices that are connected (e.g., through a wired or wireless connection) to the deployed device, and others.

In embodiments, the deployed device can self-report information regarding the network and devices that are directly connected to or associated with the deployed device. For example, the deployed device may self-report information such as near hop media access control (MAC) addresses, in-range wireless networks, whole home connected devices (e.g., digital video recorder (DVR) connected via Wi-Fi, MoCA, etc.), WAN side Internet protocol (IP) address of embedded data over cable service interface specification (DOCSIS) chipset, discoverable Bluetooth devices, radio frequency (RF) remote MAC address, and others. Self-reported information may include information associated with any/all devices on a common subscriber account (e.g., multiple STBs may be associated with a single billing account).

In embodiments, a device (e.g., access device 115, client device 105, etc.) may be configured to monitor communications received from one or more other wireless devices that are within a wireless range provided by a wireless network. The device may retrieve device identification information from a received communication, wherein the device identification information includes a unique identifier (e.g., media access control (MAC) address, etc.) associated with the wireless device from which the communication was received. For example, while a radio or other wireless transmitter associated with a wireless device is enabled, the wireless device may periodically output a request for identification of local access devices (e.g., probe request message transmitted from a station during the 802.11 discovery process).

In embodiments, an effective location fingerprint may include information associated with devices connected to a network (e.g., LAN, WLAN, etc.) associated with the deployed device. For example, the effective fingerprint may include information associated with a cable modem, an optical network terminal (ONT), a home router, wireless connected devices with direct connection, MoCA network connected devices, and other devices that are known or discovered to be directly connected to the deployed device (or within a certain number of hops of the deployed device).

In embodiments, an effective location fingerprint may include information associated with peripheral devices configured to communicate with the deployed device, but that may not be otherwise connected to a network. For example, an application running on a mobile device or tablet may be used to search content/change channels, and may further be used to collect over the air information (e.g., in-range wireless networks, discoverable Bluetooth devices, etc.) to be included in an effective fingerprint. The peripheral device (e.g., mobile device) may serve as a proxy for the deployed device by collecting information associated with one or more surrounding devices and/or networks and delivering the information to the deployed device or to a monitoring server.

In embodiments, devices that are associated with the subscriber (e.g., mobile device) that have a related application may record cell tower information, Wi-Fi network information, and others. In embodiments, information associated with a cell/mobile or other wireless service may be specifically retrieved when the mobile device is most likely to be at the subscriber premise 110 or may be gleaned from the data to be at the subscriber premise 110. The information may be retrieved when it is known that the device is in use.

Information for inclusion into a fingerprint for a deployed device may include any information serving to identify a device that is connected to or that is in proximity to the deployed device, and the information may further include information serving to identify the position of the deployed device respective to the other identified devices. For example, the fingerprint may include MAC addresses of adjacent or reachable devices, STB generated identification/notification (e.g., broadcast message from STB application), wireless network information (e.g., reachable service set identifiers (SSID), channels, power levels, security, and other information retrieved from a wireless STB, gateway, modem, mobile device, tablet, etc.), radio-frequency (RF) related technologies (e.g., Bluetooth, ZigBee, RF for consumer electronics (RF4CE), etc.), in-home network specific information (MoCA, HomePNA (home phoneline networking alliance), etc.), Internet of things (IoT) devices reachable by a home data service or cable modem (e.g., refrigerator, home security system, and/or other personal devices or appliances), application based captures (e.g., tablet application, mobile device application, etc.), and others.

In embodiments, the location fingerprint generated for a device may include information identifying a proximity and/or direction between the device and one or more other proximal devices associated with the device. For example, the device may retrieve a signal strength from communications received from the proximal device(s) and may determine a proximity of each respective proximal device to the device based on the retrieved signal strength. Proximal devices as described herein may include devices, networks, and/or devices supporting a network that is visible to a subject device. The device may determine a relative direction of each respective proximal device by measuring the strength of a signal received from the proximal device across a plurality of antennas/receivers associated with the device (e.g., in the case of a multiple-input multiple-output (MIMO) device) or across a plurality of segments of a single antenna/receiver (e.g., in the case of a single-input single-output (SISO) device). For example, the location of each respective proximal device may be triangulated using the measured signal strengths at each of the plurality of antennas/receivers or plurality of antenna/receiver segments. The location of each respective proximal device may be determined based upon signal strengths associated with the proximal device as received in communications at a plurality of different access devices 115. For example, the signal strengths retrieved at the plurality of access devices 115 may be recovered by a single device, and the location of the proximal device may be triangulated using the retrieved signal strengths and relative positions of the access devices 115 at which the signal strengths were retrieved. It should be understood that proximal devices identified by a device may include devices that are located within a neighboring premise. For example, a client device 105 or access device 115 that is located within the subscriber premise 110 may be within the range of a client device or access device that is located outside of the subscriber premise 110 or within a neighboring premise.

It should be understood that a baseline location fingerprint may be generated for a deployed device, wherein the baseline location fingerprint establishes the information observed by the deployed device when the device is located in a certain subscriber premise 110. Subsequent location fingerprint measurements may be taken to determine whether the location fingerprint for a device has changed. It should be understood that subsequent location fingerprint measurements may be made at certain predetermined intervals or upon the occurrence of certain events.

In embodiments, a technician may establish a baseline location fingerprint when the associated device is deployed within a subscriber premise 110 (or when maintenance or other service is performed at the subscriber premise 110). For example, the technician may use an application to gather information to be included in the baseline location fingerprint.

The wireless environment of a subscriber premise 110 is likely to experience some level of change with time. For example, specific wireless-capable devices may be removed and/or may be added to the wireless environment of a subscriber premise 110. Thus, the proximal devices (e.g., device in proximity to a deployed device) associated with a deployed device may change. In embodiments, the baseline location fingerprint of a deployed device may be updated. For example, a wireless network or device that was included in an original or prior baseline location fingerprint may disappear entirely from a device's location fingerprint (i.e., where a device or network is removed from a subscriber premise 110 or from a neighboring subscriber premise) and the new baseline location fingerprint would no longer include that wireless network or device. A new baseline location fingerprint for a device may be established periodically at predetermined intervals or upon the occurrence of an event or condition (e.g., during an update to the wireless environment of a subscriber premise 110).

All of the above methods may be used individually or in combination to create direct and indirect location fingerprint(s) for locations within which a device is deployed. If the device is moved, the related direct and indirect location fingerprints can be compared to a baseline location fingerprint to identify that movement.

When the determination is made that a measured location fingerprint for a deployed device differs from a baseline location fingerprint associated with the deployed device, the determination may be made that the device is being used outside of its intended scope, and appropriate action may be taken. For example, the deployed device may be configured to shut down or otherwise preclude access to services when the location fingerprint of the device changes significantly from the baseline location fingerprint. An alert may be generated and received by an MSO to signal a suspected movement (i.e., relocation) or theft of a deployed device when a measured location fingerprint of the device significantly differs from the baseline location fingerprint associated with the device. A user (e.g., MSO, technician, etc.) may establish the amount of change between a baseline location fingerprint and a subsequent location fingerprint that constitutes a significant change which will lead to an alert being created.

In embodiments, a location fingerprint change threshold may be configured for a deployed device, the threshold establishing the amount of change between a baseline location fingerprint and subsequent location fingerprint that will give rise to an alarm being triggered that signals a misuse or significant movement of the device. The threshold may be based on differences between the number of devices included in the baseline and subsequent location fingerprints, the identities of devices included in the baseline and subsequent location fingerprints, the strength of interaction (e.g., signal strength) between the device and devices included in the baseline and subsequent location fingerprints, and others. The threshold may be based upon the type of device being monitored, a subscription associated with the device, network environment factors such as a type of residence associated with the device (e.g., single family home, multiple dwelling unit (MDU), etc.), geographical location associated with the device (e.g., urban or rural dwelling), and/or others.

Information to be included in the effective location fingerprint of a deployed device may be gathered by the deployed device. The deployed device may be configured to generate the effective location fingerprint using gathered information. In embodiments, the effective location fingerprint may be generated by a device other than the deployed device. For example, the effective location fingerprint may be generated and stored at an upstream device (e.g., headend device, location fingerprint system 130 or other MSO-managed server, etc.).

In embodiments, various sources and parameters may be used to establish a trigger for capturing the location fingerprint of a device and thresholds for alerting a suspicion of a device being misused or stolen, the sources and parameters including, but not limited to capture element of using time series of data (i.e., do not trigger on transient events), user defined thresholds based on environment deployment, and cross-correlation to both the same account and geographically close accounts.

Monitoring parameters may be configured to anticipate that the electronic location fingerprint of a monitored device will change over time and will require the observed change to be consistent for a period of time to avoid false triggers on transient events (such as wireless cable modem/wireless router equipment change/upgrade). For example, as other devices surrounding the device may change in operational status (e.g., signal strength, powered on/off, etc.) and/or may be moved around or away from an associated premise, some user defined threshold of devices and networks are expected to change without triggering an alarm that the subject device has been relocated outside of the subscriber premise 110.

In embodiments, user defined thresholds may be used for triggering a location fingerprint change event, and the user defined thresholds may be based upon both the environment into which the monitored device is deployed (single family home vs. a multi-dwelling unit (MDU) such as an apartment building or townhouse) and the number and type of changes observed (directly connected devices, indirectly connected devices and observable networks). With evolving electronic fields, the location fingerprints and the triggering events are expected to evolve over time as well.

As an example, consider a MDU wherein the associated wireless network changes significantly for data observations recorded for a sustained period (e.g., one (1) week), with the strongest visible network becoming much weaker and a second wireless network that may have been weaker or invisible becoming the strongest network, and wherein at least one (e.g., 'one' being a user defined threshold) other device or network change is observed. This location fingerprint change can be considered to be consistent with a device being moved down a hallway to another apartment within the same building, and may therefore rise to the level of an alert being generated to inform an MSO of the device relocation and potential misuse.

In embodiments, cross-correlation may be used in the determination whether a location fingerprint change rises to the level of causing an alarm to be triggered. For example, if a second set-top or other monitored device on the same account as a first CPE device, or on a different account capable of observing similar fingerprint elements, did not change over the same period, then the above change may be more strongly indicative of a trigger.

The user defined thresholds may be based upon information stored within the baseline or effective location fingerprint. Information including, but not limited to strength of a wireless signal, type of proximity (physical proximity, communication capability, etc.), longevity of device/network (e.g., a refrigerator or other appliance might be expected to remain within the subscriber premise 110 for a longer duration of time than other devices), neighborhood threshold/characteristics (e.g., amount of device theft/misuse occurring within a neighborhood associated with the subscriber premise 110), and/or others may be stored within the baseline or effective location fingerprint and may be used to determine one or more differences between the baseline or effective location fingerprint and a subsequently measured location fingerprint that will indicate a potential misuse of the deployed device.

It should be understood that multiple baseline or effective location fingerprints may be established for a deployed device. For example, a user may take the deployed device back and forth between a residence and a place of business, and the deployed device may detect the periodic movement of the device. Once the periodic movement is detected, the deployed device may create a baseline or effective location fingerprint for each of the locations.

Figure 2:
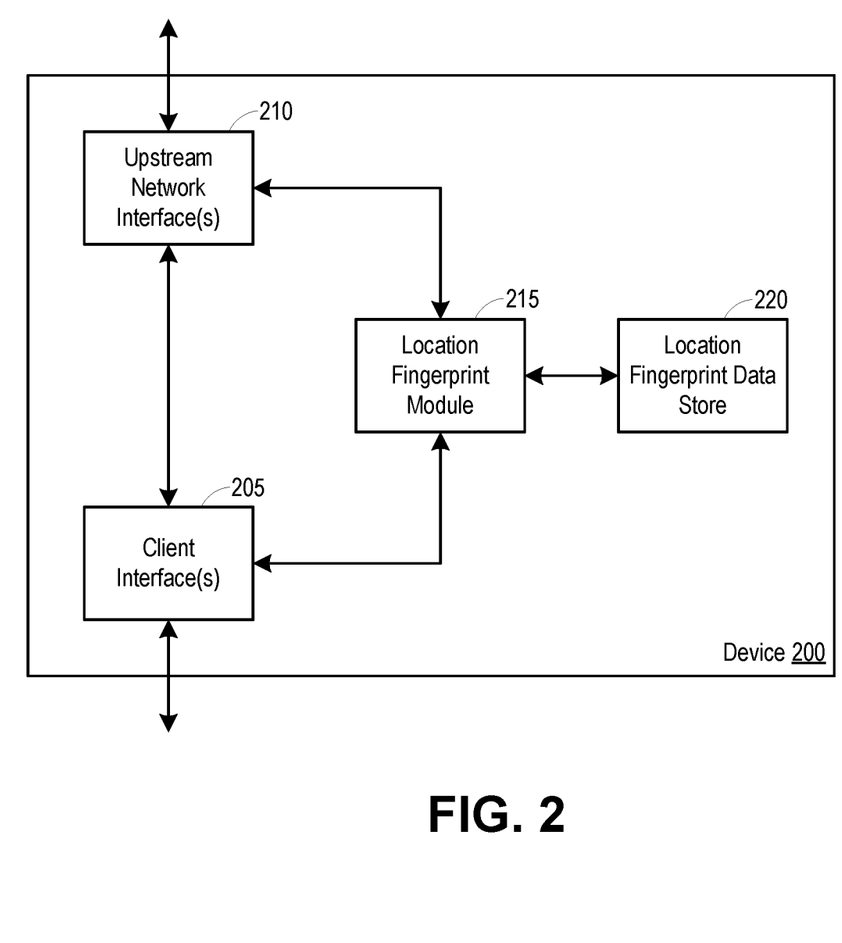
FIG. 2 is a block diagram illustrating an example device operable to facilitate the monitoring and detection of a device relocation.

FIG. 2 is a block diagram illustrating an example device 200 operable to facilitate the monitoring and detection of a device relocation. The device 200 may include one or more client interfaces 205, one or more upstream network interfaces 210, a location fingerprint module 215, and a location fingerprint data store 220. In embodiments, the device 200 may be a client device 105 of FIG. 1, an access device 115 of FIG. 1, or any other device.

In embodiments, one or more client interfaces 205 may provide an interface for facilitating communications between the device 200 and one or more client devices (e.g., client devices 105 of FIG. 1 such as mobile devices, tablets, wearable devices, set-top boxes, computers, televisions, IoT devices, etc.) and/or access devices 115 of FIG. 1 (e.g., gateway device, wireless router, network extender, or other access point). For example, multiple services may be output from the device 200 through the client interface(s) 205 and may be delivered to one or more client devices 105 over a local network (e.g., LAN, WLAN, MoCA, etc.). It should be understood that a client interface 205 may be configured to receive and/or output communications using various communication techniques, protocols, and standards (e.g., Ethernet, Wi-Fi, Multimedia over Coax Alliance (MoCA), twisted pair, etc.). Wireless communications may be transmitted to and received from one or more client devices 105 through the client interface(s) 205.

In embodiments, the client interface(s) 205 may include one or more antennas for transmitting and receiving wireless communications. The client interface(s) 205 may include a multiple input/multiple output (MIMO) antenna configuration (e.g., 2×2, 3×3, 4×4, etc.) or a single input/single output (SISO) antenna configuration (e.g., 1×1).

In embodiments, the device 200 may receive one or more services and/or may communicate with one or more upstream devices (e.g., gateway device or other access device 115 of FIG. 1) or network elements (e.g., location fingerprint system 130 of FIG. 1) through one or more upstream network interfaces 210. The one or more upstream network interfaces 210 may include various interface types associated with various protocols and/or standards. The one or more upstream network interfaces 210 may be configured to receive downstream communications and to output upstream communications.

In embodiments, the location fingerprint module 215 may generate a location fingerprint for the device 200. The location fingerprint may include an identification of one or more proximal devices, networks, and/or specific companion application instances that are associated with the device 200 and various characteristics of the association between the devices, networks, and/or instances and the device 200. The proximal devices associated with the device 200 may be devices associated with the same subscriber or premise as the device 200, devices that are identified as being in proximity of the device 200, devices that are connected (e.g., through a wired or wireless connection) to the device 200, and others. It should be understood that proximal devices may include devices located within a neighboring premise of the subscriber premise associated with the device 200. For example, the device 200 may be within the communication range of one or more client devices and/or access devices located in a neighboring premise.

In embodiments, the location fingerprint module 215 may monitor communications received at the device 200 and may retrieve information associated with a proximal device from a communication received at the device 200 from the proximal device. For example, the location fingerprint module 215 may retrieve device identification information from a received communication, wherein the device identification information includes a unique identifier (e.g., media access control (MAC) address, etc.) associated with the device from which the communication was received. Information gathered by the location fingerprint module 215 (e.g., through a client interface 205 or upstream network interface 210) and included within a generated location fingerprint may include near hop media access control (MAC) addresses, in-range wireless networks, whole home connected devices (e.g., digital video recorder (DVR) connected via Wi-Fi, MoCA, etc.), WAN side Internet protocol (IP) address of embedded data over cable service interface specification (DOCSIS) chipset, discoverable Bluetooth devices, radio frequency (RF) remote MAC address, and others.

In embodiments, the location fingerprint module 215 may retrieve, and include within a location fingerprint, information associated with devices connected to a network (e.g., LAN, WLAN, etc.) associated with the device 200. For example, the location fingerprint may include information associated with a cable modem, an optical network terminal (ONT), a home router, wireless connected devices with direct connection, MoCA network connected devices, and other devices that are known or discovered to be directly connected to the device 200 (or within a certain number of hops of the device 200).

In embodiments, the location fingerprint module 215 may retrieve, and include within a location fingerprint, information associated with peripheral devices that are configured to communicate with the device 200, but that may not be otherwise connected to a network. The location fingerprint module 215 may retrieve information associated with devices or networks that are associated with a peripheral device, but that are not associated with the device 200. For example, an application running on a client device (e.g., mobile device or tablet) may be used to collect over the air information (e.g., in-range wireless networks, discoverable Bluetooth devices, etc.) to be included in a location fingerprint, and this information may be communicated from the client device to the location fingerprint module 215 via the client interface(s) 205.

In embodiments, the location fingerprint module 215 may retrieve geographical information or proximity information associated with one or more proximal devices for inclusion in a location fingerprint. For example, geographical or proximity information may include information associated with a cell tower, mobile hotspot, WLAN network, or other network with which a proximal device is associated. Information retrieved by the location fingerprint module 215 for inclusion into a location fingerprint for the device 200 may include any information serving to identify a device that is connected to or that is in proximity to the device 200, and the information may further include information serving to identify the position of the device 200 respective to the other identified devices. For example, the location fingerprint may include MAC addresses of adjacent or reachable devices, STB generated identification/notification (e.g., broadcast message from STB application), wireless network information (e.g., reachable service set identifiers (SSID), channels, power levels, security, and other information retrieved from a wireless STB, gateway, modem, mobile device, tablet, etc.), RF related technologies (e.g., Bluetooth, ZigBee, RF for consumer electronics (RF4CE), etc.), in-home network specific information (MoCA, HomePNA (home phoneline networking alliance), etc.), Internet of things (IoT) devices reachable by a home data service or cable modem (e.g., refrigerator, home security system, and/or other personal devices or appliances), application based captures (e.g., tablet application, mobile device application, etc.), and others.

In embodiments, the location fingerprint module 215 may determine a proximity and/or direction between the device 200 and one or more other proximal devices associated with the device 200, and the proximity and/or direction information may be included within a location fingerprint. For example, the device 200 may retrieve a signal strength (e.g., received signal strength indication (RSSI) value) from communications received from the proximal device(s) and may determine a proximity of each respective proximal device to the device 200 based on the retrieved signal strength. The location fingerprint module 215 may determine a relative direction of each respective proximal device by measuring the strength of a signal received from the proximal device across a plurality of antennas/receivers associated with the device 200 (e.g., in the case of a multiple-input multiple-output (MIMO) device) or across a plurality of segments of a single antenna/receiver (e.g., in the case of a single-input single-output (SISO) device). For example, the location of each respective proximal device may be triangulated using the measured signal strengths at each of the plurality of antennas/receivers or plurality of antenna/receiver segments. The location of each respective proximal device may be determined based upon signal strengths associated with the proximal device as received in communications at a plurality of different access devices 115 of FIG. 1. For example, the signal strengths retrieved at the plurality of access devices 115 may be recovered by the location fingerprint module 215, and the location of the proximal device may be triangulated using the retrieved signal strengths and relative positions of the access devices 115 at which the signal strengths were retrieved.

In embodiments, the location fingerprint module 215 may generate a baseline location fingerprint associated with the device 200. The location fingerprint module 215 may generate a location fingerprint using retrieved information at a predetermined time or upon the occurrence of a triggering event or condition, and the location fingerprint may be stored as a baseline location fingerprint. The baseline location fingerprint may be stored at the location fingerprint data store 220 of FIG. 2 or at a remote device (e.g., gateway device within an associated subscriber premise) or upstream server/system (e.g., location fingerprint system 130 of FIG. 1). The location fingerprint module 215 may generate a baseline location fingerprint at a certain time when it is known or expected that the device 200 is located within a designated subscriber premise. For example, a technician or MSO-controlled entity may cause the location fingerprint module 215 to generate and store a baseline location fingerprint during an installation of the device 200 at a subscriber premise or during an upgrade to the network environment of the subscriber premise. It should be understood that a baseline location fingerprint associated with the device 200 may be updated to account for changes occurring within the network environment of an associated premise. For example, the location fingerprint module 215 may generate an updated baseline location fingerprint for the device 200 periodically at predetermined intervals or upon the occurrence of an event or condition (e.g., during an update to the wireless environment of a subscriber premise).

In embodiments, after the generation of a baseline location fingerprint, the location fingerprint module 215 may capture a current location fingerprint associated with the device 200. The location fingerprint module 215 may identify proximal devices currently associated with the device 200 and may retrieve information associated with one or more of the identified proximal devices. The location fingerprint module 215 may generate a current location fingerprint using the retrieved information. The location fingerprint module 215 may capture a current location fingerprint upon the detection of a trigger. In embodiments, the location fingerprint module 215 may be configured to periodically trigger the capture of a current location fingerprint of the device 200, or a subscriber or other party may manually trigger the capture of a current location fingerprint of the device 200. For example, a subscriber may send a signal to the location fingerprint module 215 via a client interface 205 (e.g., remote control unit (RCU) or physical button at the device) or other device associated with the device 200 (e.g., mobile device or other station), wherein the signal initiates the capture of the current location fingerprint, or a technician or MSO-controlled entity may send a signal to the device 200 (e.g., a signal output from an associated access device or upstream server/system and received through an upstream network interface 210) causing the capture of the current location fingerprint. In embodiments, the location fingerprint module 215 may be configured to capture a current location fingerprint upon the occurrence of various other conditions/events including, but not limited to a boot of the device, a recognition of a new local network (e.g., new SSID), a recognition of a new output device (e.g., STB recognizing a new display device connected via a high-definition multimedia interface (HDMI) or other interface), and others.

In embodiments, the location fingerprint module 215 may compare a current location fingerprint to a baseline location fingerprint associated with the device 200. The location fingerprint module 215 may compare information associated with proximal devices identified during the current location fingerprint capture to information associated with proximal devices identified during the generation of the baseline location fingerprint. If the determination is made that the current location fingerprint for the device 200 significantly differs from a baseline location fingerprint associated with the device 200, the location fingerprint module 215 may make the determination that the device 200 is being used outside of its intended scope, and appropriate action may be taken. For example, the location fingerprint module 215 may be configured to initiate a shutdown of the device 200 or otherwise preclude access to services when the location fingerprint of the device 200 changes significantly from the baseline location fingerprint. When a current location fingerprint of the device 200 significantly differs from the baseline location fingerprint associated with the device 200, the location fingerprint module 215 may generate and output an alert (e.g., via a client interface 205 or an upstream network interface 210) to a remote device or upstream server/system (e.g., location fingerprint system 130 of FIG. 1), wherein the alert provides an indication that the device 200 has potentially been improperly relocated outside of a designated subscriber premise. It should be understood that the location fingerprint module 215 may be configured with a threshold amount of change between a baseline location fingerprint and a subsequent location fingerprint that constitutes a significant change and will lead to an alert being created. The threshold may be based upon the type of device being monitored, a subscription associated with the device, a type of residence associated with the device (e.g., single family home, multiple dwelling unit (MDU), etc.), geographical location associated with the device (e.g., urban or rural dwelling), and others.

In embodiments, if the determination is made that the current location fingerprint is different than the baseline location fingerprint, but that the difference does not rise to a predetermined level of significance, the location fingerprint module 215 may update the baseline location fingerprint stored for the device 200 with the current location fingerprint.

In embodiments, the location fingerprint module 215 may delay an output of an alert indicating a potential misuse of the device 200 until after the significant difference between the current location fingerprint and the baseline location fingerprint has been observed for a predetermined duration of time. For example, after the location fingerprint module 215 identifies a significant difference between a current location fingerprint and a baseline location fingerprint, the location fingerprint module 215 may wait for a predetermined duration of time before capturing a subsequent location fingerprint. The location fingerprint module 215 may compare the subsequent location fingerprint to the baseline location fingerprint, and if a significant difference exists between the subsequent location fingerprint and the baseline location fingerprint, the location fingerprint module 215 may output the alert. Delaying the output of the alert may prevent the output of a false alarm triggered by a transient event (such as wireless cable modem/wireless router equipment change/upgrade).

Figure 3:
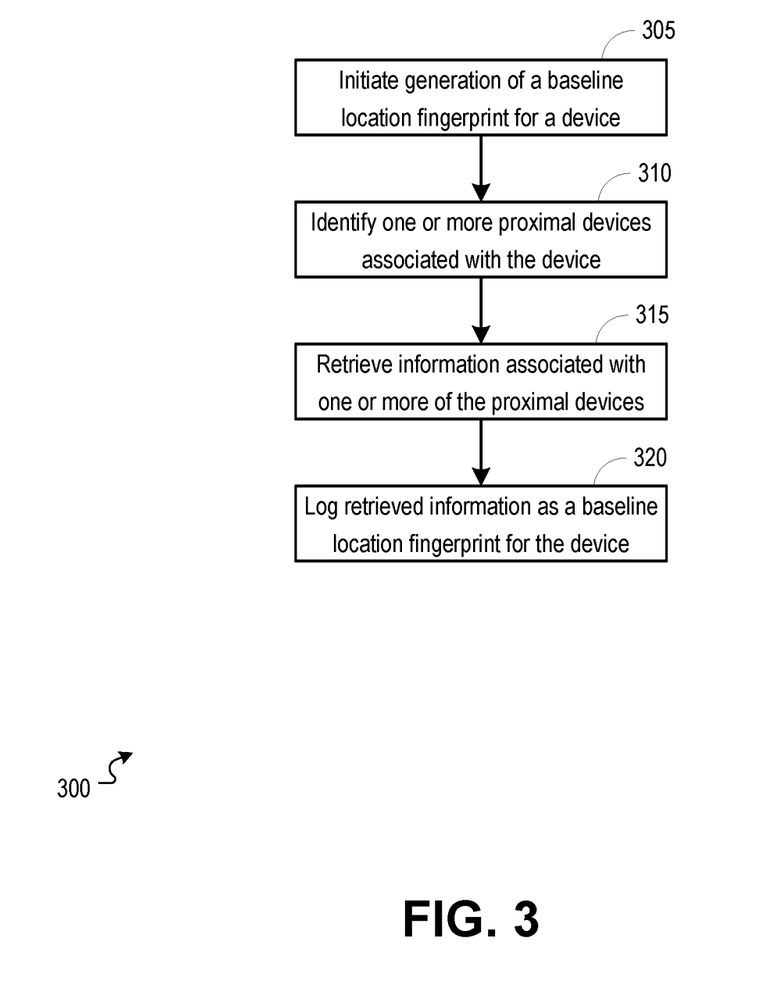
FIG. 3 is a flowchart illustrating an example process operable to facilitate the generation of a baseline location fingerprint for a device.

FIG. 3 is a flowchart illustrating an example process 300 operable to facilitate the generation of a baseline location fingerprint for a device. The process 300 may begin at 305, when a generation of a baseline location fingerprint for a device is initiated. In embodiments, the generation of a baseline location fingerprint for a device may be triggered by various users, parties, events, and/or conditions. For example, generation of a baseline location fingerprint may be initiated by a user or technician installing the device within a subscriber premise, or may be initiated remotely by a provider of the device or service associated with the device (e.g., MSO may remotely trigger generation of the baseline location fingerprint via a remote server such as the location fingerprint system 130 of FIG. 1). Generation of the baseline location fingerprint may be initiated at a predetermined duration of time after installation of the device (or after an update has been made to a wireless environment associated with the device), or may be initiated periodically. It should be understood that the device for which a baseline location fingerprint is generated may include a client device 105 of FIG. 1, an access device 115 of FIG. 1, or various other types of devices. It should be further understood that the process 300 may be carried out by the device for which the baseline location fingerprint is being generated, by a remote device or server (e.g., location fingerprint system 130 of FIG. 1, or other device within an associated subscriber premise), or by some combination of the device and/or one or more other devices.

At 310, one or more proximal devices associated with the device may be identified. Proximal devices associated with the device may be identified, for example, by a location fingerprint module 215 of FIG. 2. In embodiments, the device may identify each device associated with, connected to, or that is otherwise near in proximity to the device as a proximal device associated with the device. For example, the device for which the baseline location fingerprint is being generated may identify each device from which the device has received a communication and each device with which the device is physically connected or wirelessly associated as a proximal device. In embodiments, the device may identify one or more devices providing a local network having a communication range within which the device is currently located. For example, the device may identify one or more available wireless communication mediums (e.g., Wi-Fi channel or SSID, Bluetooth connection, mobile hotspot, mobile communications network, etc.) and may further identify one or more access devices providing the available wireless communication mediums as proximal devices.

At 315, information associated with one or more of the proximal devices may be retrieved. Information associated with one or more of the proximal devices may be retrieved, for example, by the location fingerprint module 215 of FIG. 2. In embodiments, information associated with one or more of the proximal devices may be retrieved from communications received at the device from the one or more proximal devices. Information associated with the proximal devices may include, for example, identification information (e.g., MAC address, device model number, or other unique identifier), proximity information (e.g., a signal strength between the device and a proximal device) serving to identify the distance between the device and a proximal device, and others.

At 320, the retrieved information may be logged as a baseline location fingerprint for the device. The retrieved information may be logged as a baseline location fingerprint, for example, by the location fingerprint module 215 of FIG. 2. The baseline location fingerprint may be stored at the device (e.g., at a location fingerprint data store 220 of FIG. 2) or may be output from the device and stored at a remote device (e.g., another client device or access device within a subscriber premise associated with the device) or server (e.g., MSO-controlled server such as the location fingerprint system of FIG. 1). In embodiments, the baseline location fingerprint may include an identification of each proximal device associated with the device at the instance in which the baseline location fingerprint was generated, and may include additional information associated with one or more of the proximal devices (e.g., proximity information).

Figure 4:
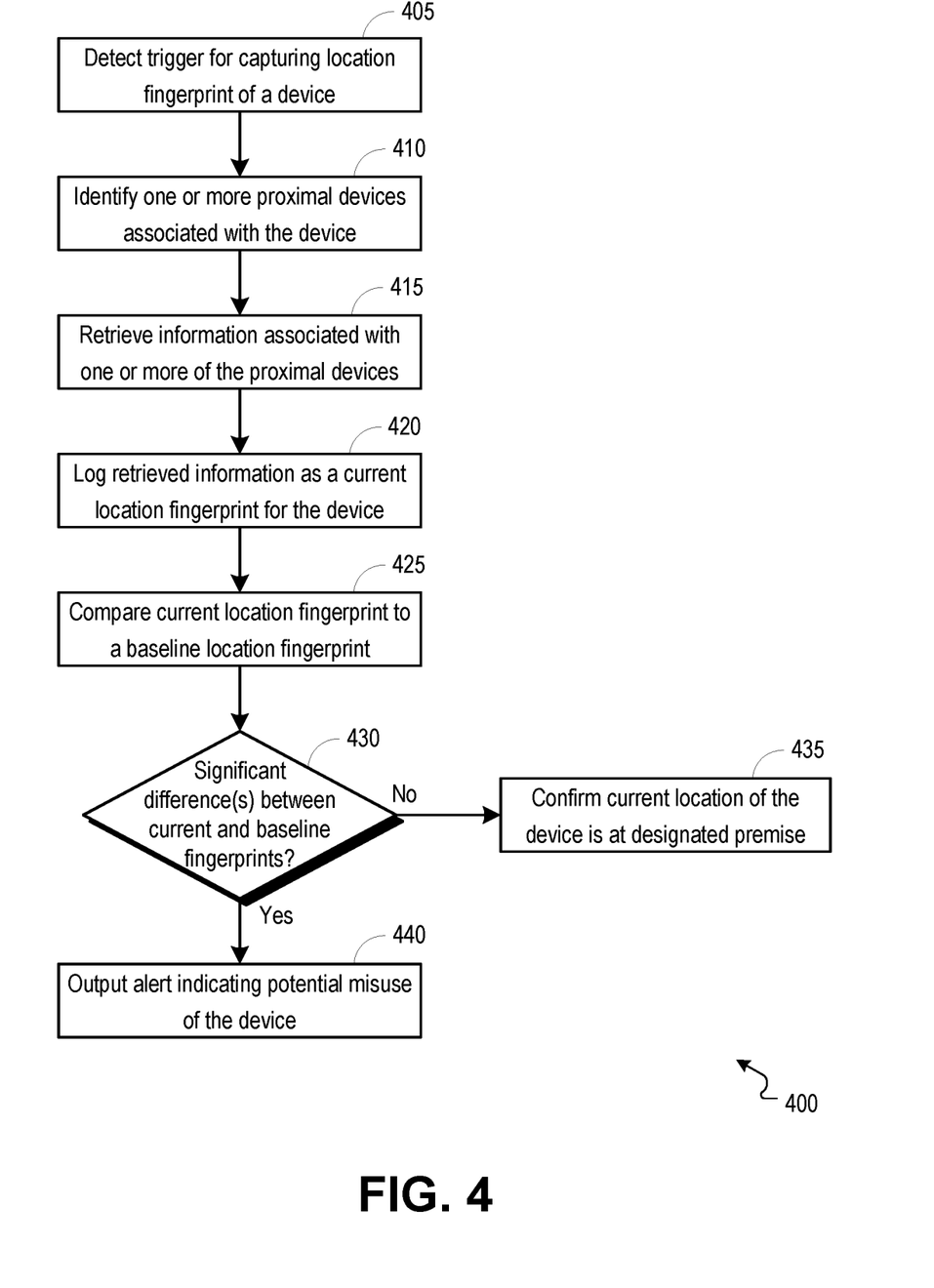
FIG. 4 is a flowchart illustrating an example process operable to facilitate a detection of device relocation based on a deviation from an associated baseline location fingerprint.

FIG. 4 is a flowchart illustrating an example process 400 operable to facilitate a detection of device relocation based on a deviation from an associated baseline location fingerprint. The process 400 may begin at 405, when a trigger for capturing the current location fingerprint of a device is detected. In embodiments, a device (e.g., client device 105 of FIG. 1, access device 115 of FIG. 1, etc.) may be configured to periodically trigger the capture of a current location fingerprint of the device, or a subscriber or other party may manually trigger the capture of a current location fingerprint of the device. For example, a subscriber may send a signal to the device (e.g., to a location fingerprint module 215) via a control interface (e.g., remote control unit (RCU) or physical button at the device) or other device associated with the device (e.g., mobile device or other station), the signal causing the capture of the current location fingerprint, or a technician or MSO-controlled entity may send a signal to the device (e.g., from an associated access device or upstream server/system) causing the capture of the current location fingerprint. In embodiments, the device may be configured to capture a current location fingerprint upon the occurrence of various other conditions/events including, but not limited to a boot of the device, a recognition of a new local network (e.g., new SSID), a recognition of a new output device (e.g., STB recognizing a new display device connected via a high-definition multimedia interface (HDMI) or other interface), and others.

At 410, one or more proximal devices associated with the device may be identified. Proximal devices associated with the device may be identified, for example, by a location fingerprint module 215 of FIG. 2. In embodiments, the device may identify each device associated with, connected to, or that is otherwise near in proximity to the device as a proximal device associated with the device. For example, the device for which the current location fingerprint is being captured may identify each device from which the device has received a communication and each device with which the device is physically connected or wirelessly associated as a proximal device. In embodiments, the device may identify one or more devices providing a local network having a communication range within which the device is currently located. For example, the device may identify one or more available wireless communication mediums (e.g., Wi-Fi channel or SSID, Bluetooth connection, mobile hotspot, mobile communications network, etc.) and may further identify one or more access devices providing the available wireless communication mediums as proximal devices.

At 415, information associated with one or more of the proximal devices may be retrieved. Information associated with one or more of the proximal devices may be retrieved, for example, by the location fingerprint module 215 of FIG. 2. In embodiments, information associated with one or more of the proximal devices may be retrieved from communications received at the device from the one or more proximal devices. Information associated with the proximal devices may include, for example, identification information (e.g., MAC address, device model number, or other unique identifier), proximity information (e.g., a signal strength between the device and a proximal device) serving to identify the distance between the device and a proximal device, and others.

At 420, the retrieved information may be logged as a current location fingerprint for the device. The retrieved information may be logged as a current location fingerprint, for example, by the location fingerprint module 215 of FIG. 2. The current location fingerprint may be stored at the device (e.g., at a location fingerprint data store 220 of FIG. 2) or may be output from the device and stored at a remote device (e.g., another client device or access device within a subscriber premise associated with the device) or server (e.g., MSO-controlled server such as the location fingerprint system of FIG. 1). In embodiments, the current location fingerprint may include an identification of each proximal device associated with the device at the instance in which the current location fingerprint was captured, and may include additional information associated with one or more of the proximal devices (e.g., proximity information).

At 425, the current location fingerprint may be compared to a baseline location fingerprint associated with the device. The current location fingerprint may be compared to the baseline fingerprint, for example, by the location fingerprint module 215 of FIG. 2. For example, the location fingerprint module 215 may compare the information included within the current location fingerprint to the information included within the baseline location fingerprint (e.g., baseline location fingerprint stored at a location fingerprint data store 220 of FIG. 2). In embodiments, device identification and/or device proximity information associated with proximal devices discovered during the capture of the current location fingerprint may be compared to device identification and/or device proximity information associated with proximal devices discovered during the generation of the baseline location fingerprint.

At 430, a determination may be made whether there is a significant difference between the current location fingerprint and the baseline location fingerprint. The determination whether there is a significant difference between the current location fingerprint and the baseline location fingerprint may be made, for example, by the location fingerprint module 215 of FIG. 2. In embodiments, the device may be configured with a difference threshold that controls the determination of what level or extent of differences constitutes a significant difference. For example, a device may be configured with a sensitive setting wherein only a slight difference between the current location fingerprint and the baseline location fingerprint (i.e., the current location fingerprint includes a proximal device not included within the baseline location fingerprint or vice versa, the current location fingerprint includes proximity information associated with a proximal device that is different from proximity information associated with the proximal device as included within the baseline location fingerprint, etc.) will constitute a significant difference, or the device may be configured with a less-sensitive setting wherein a finding of a significant difference between the current and baseline fingerprints requires a greater number of differences between proximal device(s) included in the fingerprints and/or greater proximity differences between the fingerprints (i.e., the current location fingerprint includes a plurality of proximal devices not included within the baseline location fingerprint or vice versa, the difference between proximity information associated with a proximal device as included within the current location fingerprint and the proximity information associated with the proximal device as included within the baseline location fingerprint indicates a significant change in the distance between the device and the proximal device as measured during the capture of the current location fingerprint and the distance between the devices as measured during the generation of the baseline location fingerprint). It should be understood that the difference threshold may vary according to different device types, use cases, and wireless environments (e.g., a device designated for use in a MDU or urban setting may be configured with a sensitive difference threshold and a device designated for use in a single family home or rural/suburban setting may be configured with a less-sensitive difference threshold).

If, at 430, the determination is made that there is not a significant difference between the current location fingerprint and the baseline location fingerprint, the process 400 may proceed to 435. At 435, confirmation may be made that the current location of the device is at a designated premise. Confirmation of current location of the device being at a designated premise may be made, for example, by the device (e.g., by the location fingerprint module 215 of FIG. 2) or by a remote device or server (e.g., location fingerprint system 130 of FIG. 1). In embodiments, where no significant difference exists between the current and the baseline fingerprints, the determination may be made that the device has not been relocated outside of a designated premise.

If, at 430, the determination is made that there is a significant difference between the current location fingerprint and the baseline location fingerprint, the process 400 may proceed to 440. At 440, an alert indicating potential misuse of the device may be output. The alert may be generated and output, for example, by a location fingerprint module 215 of FIG. 2. In embodiments, the alert may include a notification that, based on the difference between the current and baseline fingerprints, the local network environment surrounding the device has changed since the baseline fingerprint was generated (e.g., during installation or upgrade to the network environment). The alert may be output to a MSO-controlled entity and may inform the MSO-controlled entity that the device is potentially being misused by a subscriber (e.g., the device has been relocated from a designated subscriber premise). The alert may be output to an upstream server (e.g., location fingerprint system 130 of FIG. 1), to a remote device within the subscriber premise (e.g., an access device 115 of FIG. 1 such as a gateway device), or to another individual or entity. In embodiments, a remote device (e.g., access device 115) or upstream system (e.g., location fingerprint system 130) may control the functioning of one or more devices connected to a home network based on the detection of a disallowed device relocation. For example, the remote device or system may terminate or preclude the delivery of services to the device that is potentially being misused.

Figure 5:
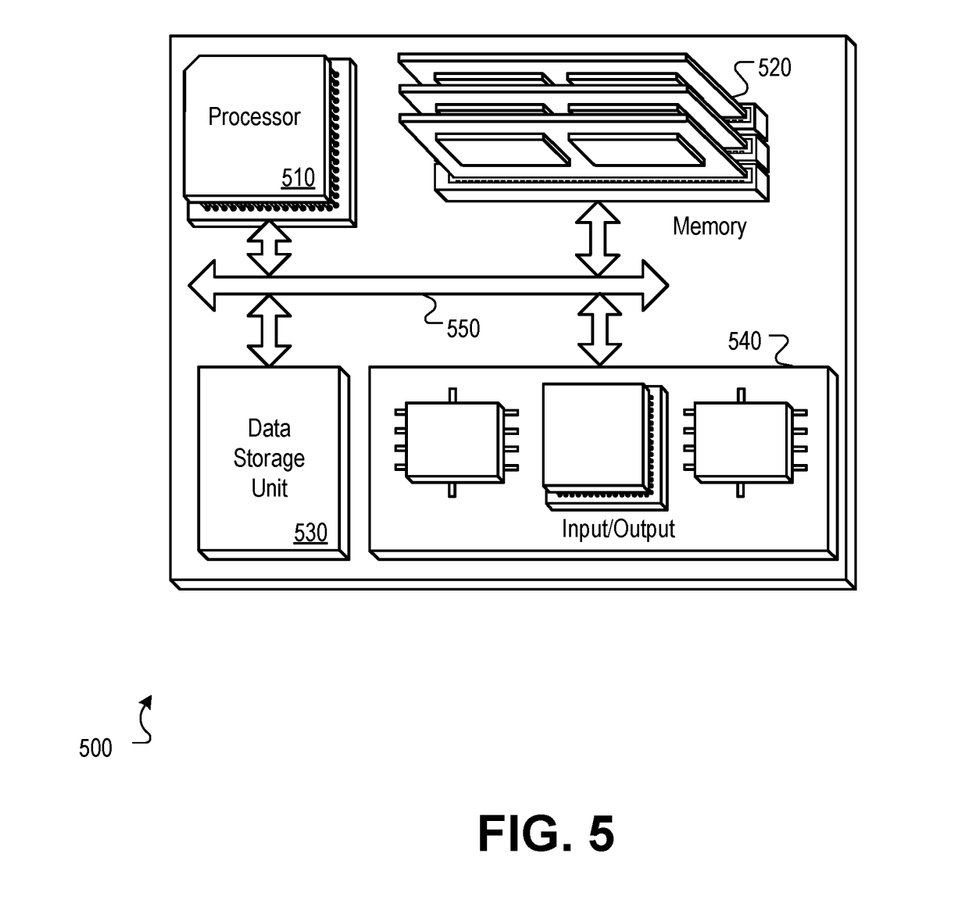
FIG. 5 is a block diagram of a hardware configuration operable to facilitate the monitoring and detection of a device relocation.

FIG. 5 is a block diagram of a hardware configuration 500 operable to facilitate the monitoring and detection of a device relocation. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to an access device 115 of FIG. 1 (e.g., gateway device, wireless router, network extender, or other access point) or a client device 105 of FIG. 1 (e.g., television, mobile device, tablet, STB, personal device, IoT device, etc.). In embodiments, the input/output device can include driver devices configured to send communications to, and receive communications from one or more networks (e.g., local network, subscriber network 125 of FIG. 1, WAN 120 of FIG. 1, etc.).

Those skilled in the art will appreciate that the invention improves upon methods and systems for detecting and alerting the relocation of a device away from a designated premise. Methods, systems, and computer readable media can be operable to facilitate the monitoring and detection of a device relocation. A location fingerprint may be generated for a device, wherein the location fingerprint includes information associated with proximal devices. Proximal devices may be identified based on communications received by the device from the proximal devices, and may include devices that are determined to be near in proximity to the device. A baseline location fingerprint may be generated at an instance when the device is expected to be within a designated premise. Subsequent captures of a location fingerprint of the device may be periodically or conditionally taken, and the subsequent location fingerprints may be compared to the baseline location fingerprint. If a significant difference exists between a subsequent location fingerprint and the baseline location fingerprint, a determination may be made that the device has potentially been relocated away from a designated premise.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   detecting a trigger for capturing a current location fingerprint associated with a first device;
   identifying one or more proximal devices associated with the first device, wherein the one or more proximal devices comprise one or more devices that are determined to be within a predetermined proximity to the first device or one or more networks having a range within which the first device is located;
   retrieving information associated with the one or more proximal devices;
   logging the retrieved information associated with the one or more proximal devices as the current location fingerprint;
   comparing the current location fingerprint to a baseline location fingerprint, wherein the baseline location fingerprint comprises information associated with one or more proximal devices previously identified as being associated with the first device, wherein the baseline location fingerprint is associated with a designated area, and wherein the current location fingerprint and the baseline location fingerprint are compared by the first device;
   determining that a difference exists between the current location fingerprint and the baseline location fingerprint;
   in response to the determination that a difference exists between the current location fingerprint and the baseline location fingerprint, determining, at the first device, whether the difference between the current location fingerprint and the baseline location fingerprint comprises a significant difference, the significant difference comprising a difference that is greater than a predetermined difference threshold that is based on one or more network environment factors associated with the first device, wherein the predetermined difference threshold is configured at the first device, and wherein the predetermined difference threshold is based upon a type of residence associated with the first device;
   determining, at the first device, that the difference between the current location fingerprint and the baseline location fingerprint comprises a significant difference, wherein in response to the determination by the first device that the difference between the current location fingerprint and the baseline location fingerprint comprises a significant difference, the first device is configured to:
      preclude access to one or more services; and
      output an alert indicating a potential relocation of the first device to a location that is outside of the designated area; and
   when the difference between the current location fingerprint and the baseline location fingerprint does not comprise a significant difference, updating the baseline location fingerprint with the current location fingerprint.

2. The method of claim 1, wherein the difference between the current location fingerprint and the baseline location fingerprint comprises a significant difference, the significant difference comprising the absence of one or more predetermined proximal devices from the current location fingerprint, wherein the one or more predetermined proximal devices are identified by the baseline location fingerprint.

3. The method of claim 1, wherein the retrieved information associated with each respective one proximal device of the one or more proximal devices comprises a unique identifier associated with the respective one proximal device.

4. The method of claim 1, wherein the retrieved information associated with each respective one proximal device of the one or more proximal devices comprises an identification of the proximity of the proximal device to the first device.

5. The method of claim 4, wherein the identification of the proximity of the proximal device to the first device comprises an indication of the signal strength between the proximal device and the first device.

6. The method of claim 1, wherein one or more of the proximal devices are identified based upon one or more wireless communications received at the first device from the one or more proximal devices.

7. An apparatus comprising:
one or more modules that:
detect a trigger for capturing a current location fingerprint associated with a first device;
identify one or more proximal devices associated with the first device, wherein the one or more proximal devices comprise one or more devices that are determined to be within a predetermined proximity to the first device or one or more networks having a range within which the first device is located;
one or more interfaces that retrieve information associated with the one or more proximal devices;
wherein the one or more modules further:
log the retrieved information associated with the one or more proximal devices as the current location fingerprint; and
compare the current location fingerprint to a baseline location fingerprint, wherein the baseline location fingerprint comprises information associated with one or more proximal devices previously identified as being associated with the first device, wherein the baseline location fingerprint is associated with a designated area, and wherein the current location fingerprint and the baseline location fingerprint are compared by the first device;
determine that a difference exists between the current location fingerprint and the baseline location fingerprint;
in response to the determination that a difference exists between the current location fingerprint and the baseline location fingerprint, determine, at the first device whether the difference between the current location fingerprint and the baseline location fingerprint comprises a significant difference, the significant difference comprising a difference that is greater than a predetermined difference threshold that is based on one or more network environment factors associated with the first device, wherein the predetermined difference threshold is configured at the first device, and wherein the predetermined difference threshold is based upon a type of residence associated with the first device;
determine that the difference between the current location fingerprint and the baseline location fingerprint comprises a significant difference, wherein in response to the determination by the first device that the difference between the current location fingerprint and the baseline location fingerprint comprises a significant difference, the first device:
precludes access to one or more services; and
outputs an alert indicating a potential relocation of the first device to a location that is outside of the designated area; and
when the difference between the current location fingerprint and the baseline location fingerprint does not comprise a significant difference, update the baseline location fingerprint with the current location fingerprint.

8. The apparatus of claim 7, wherein the difference between the current location fingerprint and the baseline location fingerprint comprises a significant difference, the significant difference comprising the absence of one or more predetermined proximal devices from the current location fingerprint, wherein the one or more predetermined proximal devices are identified by the baseline location fingerprint.

9. The apparatus of claim 7, wherein the retrieved information associated with each respective one proximal device of the one or more proximal devices comprises an identification of the proximity of the proximal device to the first device.

10. The apparatus of claim 7, wherein one or more of the proximal devices are identified based upon one or more wireless communications received at the first device from the one or more proximal devices.

11. One or more non-transitory computer readable media having instructions operable to cause one or more processors to perform the operations comprising:
detecting a trigger for capturing a current location fingerprint associated with a first device;
identifying one or more proximal devices associated with the first device, wherein the one or more proximal devices comprise one or more devices that are determined to be within a predetermined proximity to the first device or one or more networks having a range within which the first device is located;
retrieving information associated with the one or more proximal devices;
logging the retrieved information associated with the one or more proximal devices as the current location fingerprint;
comparing the current location fingerprint to a baseline location fingerprint, wherein the baseline location fingerprint comprises information associated with one or more proximal devices previously identified as being associated with the first device, wherein the baseline location fingerprint is associated with a designated area, and wherein the current location fingerprint and the baseline location fingerprint are compared by the first device;
determining that a difference exists between the current location fingerprint and the baseline location fingerprint;
in response to the determination that a difference exists between the current location fingerprint and the baseline location fingerprint, determining, at the first device, whether the difference between the current location fingerprint and the baseline location fingerprint comprises a significant difference, the significant difference comprising a difference that is greater than a predetermined difference threshold that is based on one or more network environment factors associated with the first device, wherein the predetermined difference threshold is configured at the first device, and wherein the predetermined difference threshold is based upon a type of residence associated with the first device;

determining, at the first device, that the difference between the current location fingerprint and the baseline location fingerprint comprises a significant difference, wherein in response to the determination by the first device that the difference between the current location fingerprint and the baseline location fingerprint comprises a significant difference, the first device is configured to:

preclude access to one or more services; and output an alert indicating a potential relocation of the first device to a location that is outside of the designated area; and when the difference between the current location fingerprint and the baseline location fingerprint does not comprise a significant difference, updating the baseline location fingerprint with the current location fingerprint.

12. The one or more non-transitory computer-readable media of claim 11, wherein the difference between the current location fingerprint and the baseline location fingerprint comprises a significant difference, the significant difference comprising the absence of one or more predetermined proximal devices from the current location fingerprint, wherein the one or more predetermined proximal devices are identified by the baseline location fingerprint.

13. The one or more non-transitory computer-readable media of claim 11, wherein the retrieved information associated with each respective one proximal device of the one or more proximal devices comprises a unique identifier associated with the respective one proximal device.

14. The one or more non-transitory computer-readable media of claim 11, wherein the retrieved information associated with each respective one proximal device of the one or more proximal devices comprises an identification of the proximity of the proximal device to the first device.

15. The one or more non-transitory computer-readable media of claim 14, wherein the identification of the proximity of the proximal device to the first device comprises an indication of the signal strength between the proximal device and the first device.

16. The one or more non-transitory computer-readable media of claim 11, wherein one or more of the proximal devices are identified based upon one or more wireless communications received at the first device from the one or more proximal devices.

* * * * *